(12) United States Patent
Frohriep et al.

(10) Patent No.: US 11,433,782 B2
(45) Date of Patent: *Sep. 6, 2022

(54) VEHICLE SEAT WITH OPERATING DEVICE

(71) Applicant: GRAMMER AG, Amberg (DE)

(72) Inventors: Susanne Frohriep, Amberg (DE); Laurent Coppejans, Overijse (BE)

(73) Assignee: GRAMMER AG, Ursensollen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,252

(22) Filed: Jul. 12, 2019

(65) Prior Publication Data
US 2020/0016996 A1    Jan. 16, 2020

(30) Foreign Application Priority Data

Jul. 13, 2018 (DE) .......................... 102018117000.9

(51) Int. Cl.
*B60R 22/00* (2006.01)
*B60N 2/02* (2006.01)

(52) U.S. Cl.
CPC ......... *B60N 2/0228* (2013.01); *B60N 2/0232* (2013.01); *B60N 2/0284* (2013.01)

(58) Field of Classification Search
CPC ............... B60N 2/0228; B60N 2/0232; B60N 2/0284; B60N 2/501; B60N 2/90; B60N 2/00; B60R 22/00
USPC .......................................................... 701/49
See application file for complete search history.

(56) References Cited

U.S. PATENT DOCUMENTS

| 6,936,935 | B2 | 8/2005 | Dinkel et al. | |
| 9,079,514 | B2 | 7/2015 | Haller | |
| 9,132,752 | B2 | 9/2015 | Pleskot | |
| 2002/0104742 | A1* | 8/2002 | Novelle | B60N 2/0228 200/5 R |
| 2003/0023353 | A1* | 1/2003 | Badarneh | B62D 1/046 701/1 |
| 2004/0118664 | A1* | 6/2004 | DePue | G06F 3/0362 200/4 |

(Continued)

FOREIGN PATENT DOCUMENTS

| CN | 103386898 | 11/2013 |
| CN | 103723056 | 4/2014 |

(Continued)

OTHER PUBLICATIONS

Official Action for German Patent Application No. 102018117000.9, dated Mar. 15, 2019, 3 pages.

(Continued)

*Primary Examiner* — Shardul D Patel
(74) *Attorney, Agent, or Firm* — Sheridan Ross P.C.

(57) ABSTRACT

The invention relates to an operating device for adjusting seat parameters of a seat, in particular of a vehicle seat, wherein the operating device comprises at least one multi-function operating element having at least one selection element, by means of which at least two operating levels are selectable, wherein the multifunction operating element is movable in at least five switching directions, wherein each switching direction can be assigned to a specific function, which belongs to the selected operating level and changes a seat parameter.

20 Claims, 8 Drawing Sheets

(56) References Cited

U.S. PATENT DOCUMENTS

| | | | |
|---|---|---|---|
| 2006/0061177 A1* | 3/2006 | Billger | B60N 2/0228 297/344.21 |
| 2010/0020028 A1* | 1/2010 | Laurent | H01H 13/704 345/173 |
| 2010/0181814 A1 | 7/2010 | Lachenmann et al. | |
| 2014/0095000 A1* | 4/2014 | Waller | G06F 3/1454 701/2 |
| 2016/0236591 A1* | 8/2016 | Lange-Mao | B60N 2/002 |
| 2016/0355111 A1 | 12/2016 | Randleman et al. | |
| 2018/0029502 A1* | 2/2018 | Georgiev | B60N 2/0228 |
| 2019/0241071 A1* | 8/2019 | Trabucco | E05F 15/60 |
| 2020/0016998 A1 | 1/2020 | Frohriep et al. | |

FOREIGN PATENT DOCUMENTS

| | | |
|---|---|---|
| CN | 203592903 | 5/2014 |
| DE | 19725175 | 12/1998 |
| DE | 19946021 | 11/2000 |
| DE | 19952560 | 5/2001 |
| DE | 10037830 | 2/2002 |
| DE | 10061346 | 6/2002 |
| DE | 10124246 | 11/2002 |
| DE | 10242236 | 4/2004 |
| DE | 10341162 | 4/2005 |
| DE | 102009009501 | 8/2010 |
| DE | 102010013014 | 9/2011 |
| DE | 102012214295 | 2/2014 |
| DE | 202016101747 | 4/2016 |
| DE | 102015213995 | 1/2017 |
| DE | 102016011307 | 3/2018 |
| EP | 0674594 | 3/1998 |
| EP | 1659020 | 5/2006 |
| EP | 2163420 | 3/2010 |
| EP | 2735469 | 5/2014 |
| EP | 3521107 | 8/2019 |
| GB | 2535535 | 8/2016 |
| JP | H03-178839 | 8/1991 |
| WO | WO 2012/082052 | 6/2012 |
| WO | WO 2015/136901 | 9/2015 |

OTHER PUBLICATIONS

Extended Search Report for European Patent Application No. 19185430.6, dated Jan. 10, 2020, 3 pages.

Official Action for German Patent Application No. 102018116991. 4, dated Mar. 25, 2019, 3 pages.

Extended Search Report for European Patent Application No. 19185440.5, dated Dec. 2, 2019, 3 pages.

Official Action for U.S. Appl. No. 16/510,421, dated Jun. 21, 2021 15 pages.

Official Action with English Translation for China Patent Application No. 201910636622.6, dated Jun. 30, 2021, 23 pages.

Official Action with English Translation for China Patent Application No. 201910637091.2, dated Jul. 1, 2021, 24 pages.

* cited by examiner

VEHICLE SEAT WITH OPERATING DEVICE

CROSS-REFERENCE TO RELATED APPLICATIONS

This application claims the benefit of German Patent Application No. DE 10 2018 117 000.9 filed Jul. 13, 2018, the entire disclosure of which is incorporated herein by reference.

FIELD

The invention relates to an operating device for setting seat parameters of a seat, in particular a vehicle seat. Furthermore, the invention relates to a seat, in particular vehicle seat, with an operating device for setting seat parameters.

BACKGROUND

In motor vehicles, especially in commercial vehicles such as tractors or trucks, it is important to offer the driver the highest possible seating comfort because of the sometimes long travel times. To make this possible, the drivers can set a variety of seat parameters according to their needs. Such seat parameters can be, for example, the seat height, the seat position in the longitudinal direction (X), the position and orientation of individual components of the seat, such as the backrest, headrest, seat cushion section, or even adjustment of a spring and/or cushioning device. Furthermore, corresponding seat parameters may relate to a seat comfort device, for example a seat air conditioning device, a seat shape adjustment device or a massage device.

Usually, a corresponding control device, such as a switch or a button, is provided for setting each seat parameter. This has the consequence that a large number of such actuators is necessary, whereby, on the one hand, the operation becomes confusing for the driver, and on the other, a large amount of space is taken up.

SUMMARY

The object of the invention is therefore to enable the operation of a variety of seat parameters in a manner which is both clear for the operator and which saves space.

This object is achieved by an operating device for setting seat parameters of a seat, in particular a vehicle seat, which is characterized in that the operating device comprises at least one multifunction operating element, which is movable in at least five switching directions, wherein each switching direction can be assigned to a particular function which changes a seat parameter.

In the following, the operating device will be described in connection with a seat. This should not be intended as a limitation. Other applications for setting a wide variety of parameters would also be conceivable.

Preferably, the multifunction operating element is connected to a seat such that a movement according to the invention is made possible. The fact that several functions can be operated by the multifunction operating element means that a variety of individual switches and buttons can be dispensed with. A considerable amount of space is thereby saved. The manufacturing costs are also reduced because fewer components must be installed. Finally, the user is presented a clear operation, since one no longer needs to search for the relevant switch or button, since different seat parameters are controlled with the multifunction operating element. "Seat parameters" are understood to mean all the settings of a seat or devices associated with the seat. However, such a seat parameter can also be understood to mean settings of other devices of the vehicle.

According to a further preferred embodiment, the operating device comprises at least one selection element, by means of which at least two operating levels are selectable. Preferably, the functions assigned to the switching directions are associated with a selected operating level. The selection element can be used to select a specific operating level which comprises a function group, for example the setting of the seat parameters for a specific component or several components of the seat. Due to the fact that the multifunction operating element can operate several operating levels, which can contain several functions, a large number of individual switches and push buttons can be dispensed with. A considerable amount of space is thereby saved. The manufacturing costs are also reduced because fewer components must be installed. Finally, the users are presented a clear operation, since one no longer needs to search for the relevant switch or button.

According to a preferred embodiment, the operating device comprises a single multifunction operating element. A variety of seat parameters can be set by means of this single multifunction operating element.

According to a further preferred embodiment, the operating device comprises two or several multifunction operating elements. These multifunction elements can have the same operating levels with the associated functions to choose from. The users are thus given the opportunity to access differently accessible locations of the seat in order to change the corresponding seat parameters. These seat parameters can thus be conveniently changed in different driving situations.

However, it would also be conceivable that the different multifunction operating elements have different operating levels, whereby a distribution of the operating levels into similar changes in the seat parameters is possible. This can be advantageous when there is a large number of operating levels.

The following only refers to a multifunction operating element. Of course, however, in the case where the operating device has two or several multifunction operating elements, the further multifunction operating elements can have the corresponding features.

According to a particularly preferred embodiment, the multifunction operating element is movable in six switching directions. Preferably, the multifunction operating element has three axes of movement. Preferably, two opposite switching directions are oriented along a movement axis (X, Y, Z).

Preferably, a first and a second switching direction correspond to a translational movement of the multifunction operating element along a first movement axis (X) in opposite directions. The multifunction operating element can thus be moved by pulling or pushing along the first or second switching direction. Preferably, the first movement axis (X) runs along the horizontal longitudinal direction (X1) of the seat. A displacement of the seat along this longitudinal direction (X1) thus corresponds to the change in the distance of the seat from the controls of the vehicle in the longitudinal direction.

According to a further preferred embodiment, a third and a fourth switching direction correspond to a translational movement of the multifunction operating element along a second movement axis (Z) in respectively opposite directions. Alternatively, the third and the fourth switching direction correspond to a rotational movement of the multifunction operating element about the first movement axis (X) in opposite directions. Preferably, the second movement axis (Z) runs along the height direction (Z1) of the seat and is perpendicular to the first movement axis (X). Both a translational movement of the multifunction operating element along the second movement axis (Y) and a rotational movement of the multifunction operating element about the first movement axis (X) means a movement of the multifunction operating element up or down for the person in the seat. Preferably, the pivot point is close to the seat to allow for a slight rotational movement of the multifunction operating element.

According to a further preferred embodiment, a fifth and a sixth switching direction correspond to a rotational movement of the multifunction operating element about the third movement axis (Y) in respectively opposite directions. Preferably, the third movement axis (Y) runs along the width direction (Y1) of the seat and is perpendicular to the first movement axis (X) and the second movement axis (Z). The pivot point can be arranged centrally, off-center of the multifunction operating element. Alternatively, the pivot point could be located at a front or a rear end of the multifunction operating element. According to the arrangement of the pivot point, different types of inclination of the multifunction operating element result.

According to a further preferred embodiment, the multifunction operating element comprises a reset unit, so that the multifunction operating element is displaceable into its initial position by means of the reset unit after a deflection along a certain switching direction after a predetermined time. Such a reset unit could be a spring element, an elastic element or an actuator which is operated electrically, pneumatically, or hydraulically.

According to a further preferred embodiment, the multifunction operating element is designed in a tabular form. The multifunction element can thus have dimensions comparable to conventional smartphones. Preferably, the multifunction element has a length in a range of 5 cm to 15 cm, a width in a range of 3 cm to 10 cm and a height in a range of 0.5 cm to 3 cm. On the one hand, such an embodiment offers an optimal gripping surface for the user and, on the other hand, the multifunction element does not take up excessive space.

According to one further preferred embodiment, the multifunction element is equipped with haptic elements and/or a grip layer. Such a grip layer can be, for example, a rubberized layer or a layer with a roughened surface. This ensures a safe and comfortable grip of the multifunction element.

Preferably, a selection element is arranged on a surface of the multifunction operating element. Preferably on a surface bounded by the length and width of the multifunction operating element. An arrangement on a lateral surface, i.e. a surface which is bounded by the height and the width of the multifunction operating element or a surface which is bounded by the height and the length of the multifunction operating element, is also conceivable.

Preferably, the selection element is designed as a switch, as a button, or as an array of switches or buttons. Alternatively or cumulatively, the selection element can be designed as a joystick, as a ball switch, or as a multi-stage button. According to a further preferred embodiment, the selection element is designed as a touch screen.

According to a further preferred embodiment, the multifunction operating element is provided with at least one identification element, by means of which the switching directions are identifiable. Such identification elements may, for example, be recesses at the front and rear end of the multifunction operating element, which may serve to identify the first and second switching directions (pull/push).

Furthermore, recesses can be provided on the top and bottom of the multifunction operating element, which can serve to identify the third and fourth switching directions (pull up/push down). The top and bottom are the opposing surfaces, which are bounded by the length and width of the multifunction operating element.

To identify the fifth and the sixth switching direction, otherwise shaped recesses may also be provided on the top and bottom of the multifunction operating element. Further, it would be possible to form a corresponding shape of the multifunction operating element as an identification element, according to the finger position during rotational movement in the fifth and the sixth switching directions. Furthermore, elevations, protrusions or otherwise designed haptic elements would also be suitable as identification elements.

According to a further preferred embodiment, illumination is provided on the multifunction operating element. This illumination can be provided for the entire multifunction operating element or only for individual elements such as the identification elements or the at least one selection element. The illumination may be an active illumination by means of conventional lamps or LEDs or may comprise a luminescent material.

According to a further preferred embodiment, a display device is arranged on the multifunction operating element. Such a display device may be a display or certain illuminated symbols. With the display device, the selected operating level can be displayed, for example. Furthermore, the selected function can be displayed.

The object is further achieved by a seat, in particular vehicle seat, with an operating device for setting seat parameters according to one of the preceding embodiments.

According to a further preferred embodiment, the seat comprises the components seat cushion section, backrest, headrest and at least one armrest. Preferably, an operating level is assigned to the entire seat or at least to one component. In this case, the seat parameter changed by a specific function preferably corresponds to a change in the position or the height of the entire seat or of at least one component. The seat parameter changed by a specific function preferably corresponds to the height of the entire seat (1) or at least one component (12, 13, 14, 15). Preferably, the seat parameter changed by a specific function corresponds to the orientation of the entire seat or at least one component. A change in orientation corresponds to a change in the inclination of the entire seat or a particular component.

Possible changes to the seating parameters for the entire seat can thus be: displacement along the longitudinal direction (X1) or adjustment of the seat spacing, displacement along the height direction (Z1) or adjustment of the seat height and rotational movement about an axis along the width direction (Y1) or adjustment of the seat or backrest inclination. Similarly, the armrest, the headrest and the seat cushion can be displaced along the longitudinal direction (X1) and the height direction (Z1), and thus the height or the position can be adjusted. Furthermore, both armrest(s) and headrest and seat cushion section can be changed in their inclination. Finally, the length of the seat cushion section can be changed.

According to a further preferred embodiment, a particular switching direction is assigned to a function of a first operating level of a change in a seat parameter of a first element, which may be the entire seat or a component, with respect to a certain seat direction (X1, Y1, Z1), and the same switching direction assigned to a function of at least one further operating level of a change in a seat parameter of a second element, which may be the entire seat or a component, with respect to a same seat direction (X1, Y1, Z1). The seat directions are the longitudinal direction (X1), the width direction (Y1) and height direction (Z1).

Accordingly, the entire seat could, for example, be assigned to the first operating level. The seat height could then be adjustable with movements of the multifunction operating element along the third and fourth switching directions (pull up/push down). A selection of at least one further operating level could then relate to the headrest. Accordingly, a corresponding height adjustment by a movement of the multifunction operating element along the same third and fourth switching directions (pull up/push down) could be adjustable. Thus, all height adjustments of the total seat and the individual components, all inclination settings and all displacement adjustments can be made along a specific seat direction (X1, Y1, Z1). This simplifies the operability of the individual setting of the seat parameters, since the user only has to memorize the corresponding switching directions for a certain type of parameter change and only has to select the corresponding component.

According to a further preferred embodiment, a movement of the multifunction operating element in a switching direction with respect to a movement axis (X, Y, Z) causes a similar change in the position and/or orientation of the entire seat or at least of one component with respect to a direction (X1, Y1, Z1) parallel to the movement axes (X, Y, Z). Thus, for example, a height adjustment, which is a displacement of the entire seat or a component along the height direction (Z1), may correspond to the third or fourth switching direction, which is moved with respect to the movement axis Y. Furthermore, a displacement of the entire seat or a component in the longitudinal direction (X1) by a movement of the multifunction operating element along the first or second switching direction can take place. Similarly, an inclination of the entire seat or a component can be caused by a similar inclination of the multifunction operating element. The user can thus intuitively make the desired setting without first having to memorize corresponding switching directions.

According to a further preferred embodiment, the operating device comprises a control unit, which receives a control signal from the multifunction operating element and controls at least one actuator, which changes the parameters with respect to the position and/or orientation of the entire seat or at least of one component correspondingly. Suitable actuators are usually pneumatic, hydraulic or electrically operated actuators. However, the use of other actuators is also possible.

According to a further preferred embodiment, an operating level is associated with at least one spring and/or cushioning device, which acts in the vertical and/or horizontal direction. The associated functions of the operating level preferably correspond to the parameter settings of the spring and/or cushioning device. Accordingly, by means of a movement of the multifunction operating element along a switching direction, for example, the hardness of the spring and/or cushioning device or another parameter of this device can be changed, or the spring/cushioning device can be activated or deactivated. Preferably, a spring and/or cushioning device which acts in the vertical direction, is associated with a different operating level than the spring and/or cushioning device which acts in the horizontal direction.

Preferably, the operating device comprises a control unit, which receives a control signal from the multifunction operating element and controls the at least one spring and/or cushioning device.

According to a further preferred embodiment, one operating level is associated with at least one seat comfort device. The associated functions of the operating level preferably correspond to the parameter settings of the seat comfort device. Preferably, a seat comfort device can be a seat air conditioning device, in particular a seat heater or a seat ventilation. Preferably, the seat comfort device may be a seat shape adjustment device. A seat shape adjustment device may be, for example, an adjustment of the side cushions on the seat cushion section, an adjustment of the side bolsters on the backrest, an adjustment of the shape of the armrest or a change in the lumbar support. The changes in the lumbar support may be a shift of the peak curvature of the lumbar support up or down, or a change in the curvature intensity of the lumbar support. Furthermore, a seat comfort device could be a massage device. Preferably, the operating device comprises a control unit which receives a control signal from the multifunction operating element and controls the at least one seat comfort device.

According to a further preferred embodiment, the multifunction operating element is arranged on the seat cushion section and/or on an armrest. Preferably, the multifunction operating element is arranged on a lateral portion of the seat cushion section and/or the armrest. A lateral portion is understood to mean those portions which are located at the lateral boundaries in the width direction (Y1) of the seat cushion section or the armrest. Such an arrangement is particularly easy to access for users.

According to a further preferred embodiment, both an operating level can be selected by means of the at least one selection element and a specific function can be operated directly. The selection element can be a switch, a push button or an array of switches or buttons. Furthermore, the selection element could be configured as a joystick, as a ball switch, or as a multi-stage button. The selection element could also be designed as a touch screen. Users can thus set the desired settings of the seat parameters directly by a corresponding movement of the multifunction operating element along the switching directions and also by means of the selection element.

According to a further preferred embodiment, one operating level is assigned to a communication device. This could be, for example, a hands-free device. Preferably, one operating level is assigned to specific vehicle settings. Such vehicle settings may relate to, for example, the interior lighting, the operation of a radio or the like. Thus, it is also possible to operate elements which have no relation to the seat.

BRIEF DESCRIPTION OF THE DRAWINGS

Further advantages, aims and properties of the present invention are explained with reference to the following description of the attached drawings. Similar components can have the same reference signs in the various embodiments.

In the drawings.

DETAILED DESCRIPTION

Figure 1:
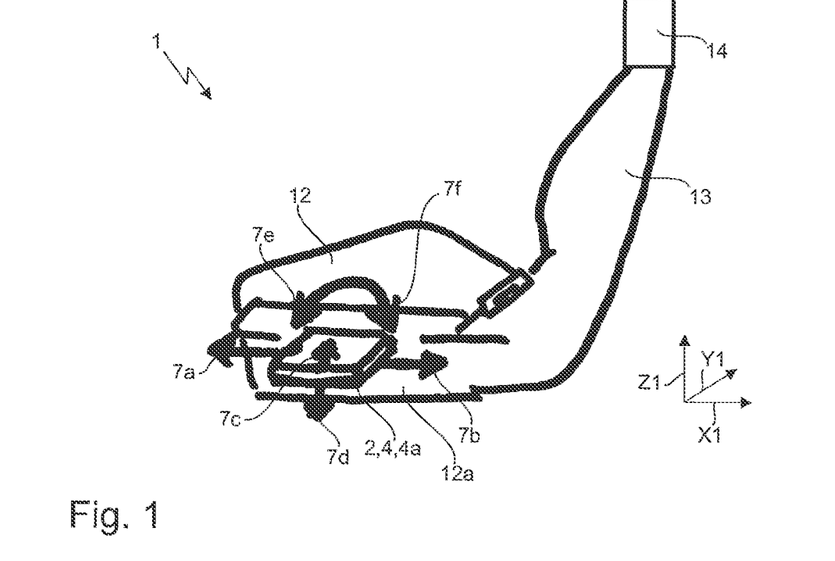
FIG. 1 shows a side view of a seat with an operating device.
Figure 4:
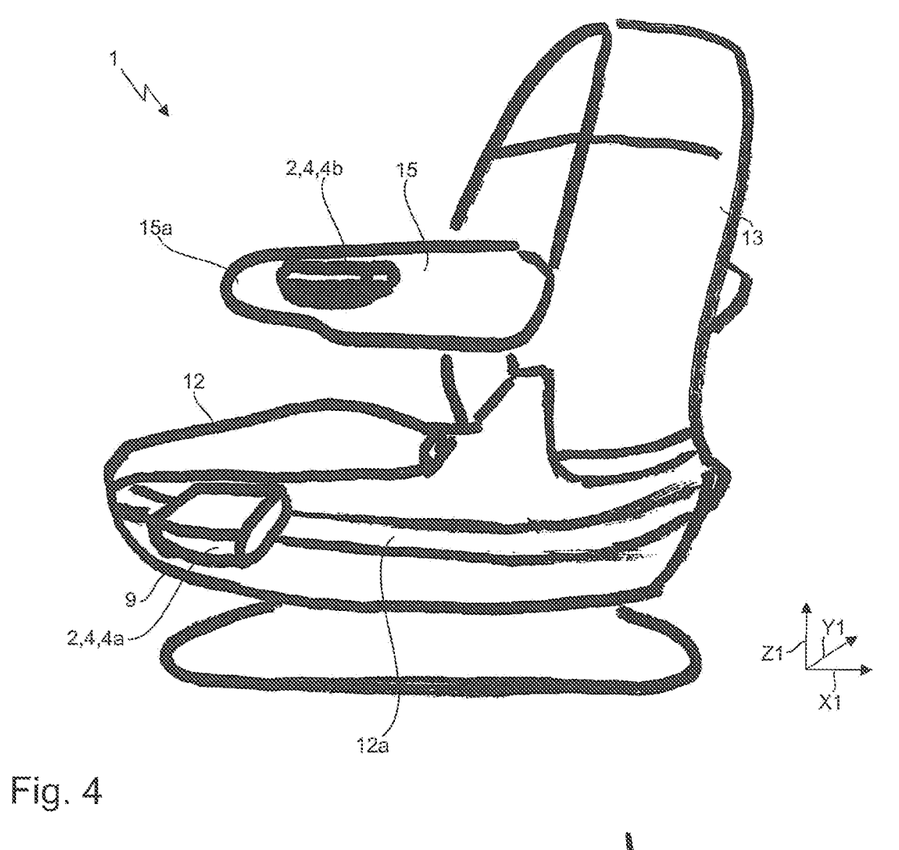
FIG. 4 shows a side view of a seat with an operating device according to a further embodiment.
Figure 6:
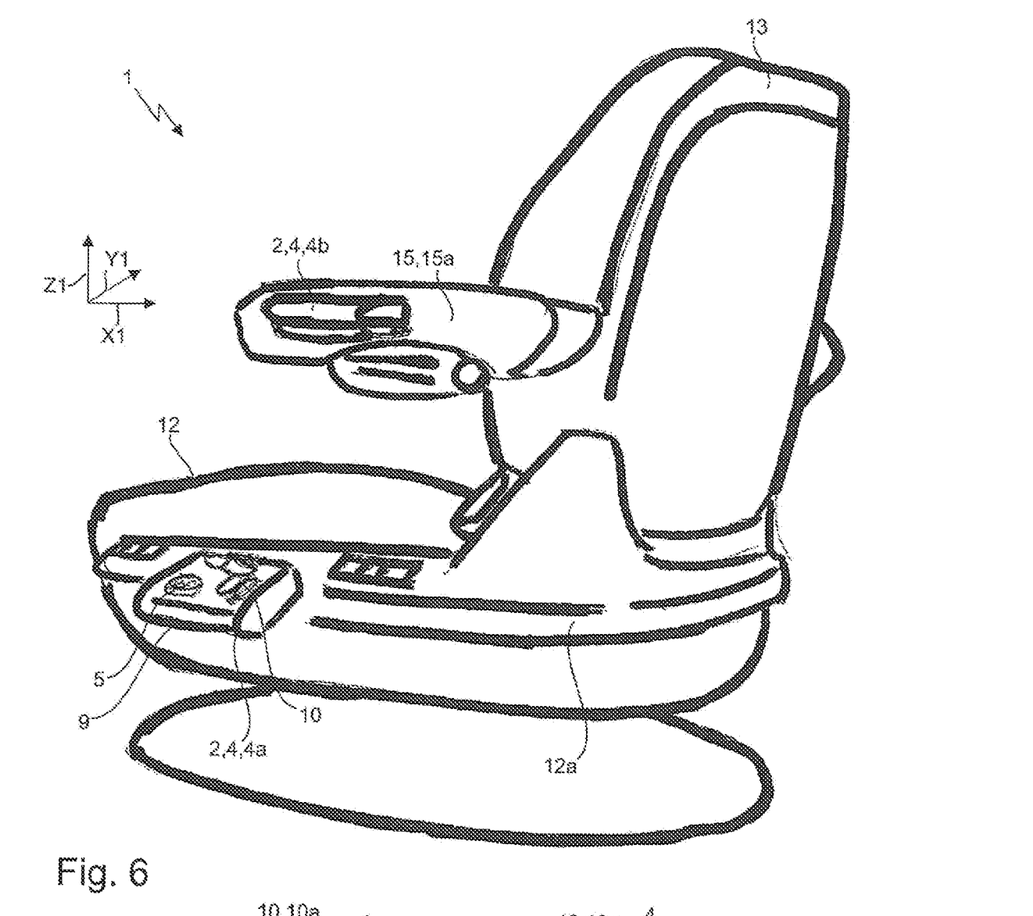
FIG. 6 shows a side view of a seat with an operating device according to a further embodiment.

FIGS. 1, 4 and 6 show a seat (1), in particular a vehicle seat. The seat (1) comprises the components seat cushion section (12), backrest (13), headrest (14) and at least one armrest (15). The seat is oriented along the seat directions (X1, Y1, Z1). These seat directions are the longitudinal direction (X1), the width direction (Y1) and the height direction (Z1).

The seat (1), in particular the vehicle seat, is equipped with an operating device (2) for setting seat parameters (3), wherein the operating device (2) comprises at least one multifunction operating element (4), which is movable in at least five switching directions (7), preferably six switching directions (7), wherein each switching direction (7) can be assigned to a specific function (8), which changes a seat parameter (3).

The operating device (2) can furthermore comprise at least one selection element (5) by means of which at least two operating levels (6) can be selected, wherein the functions (8) assigned to the switching directions (7) are associated with a selected operating level. This allows an even greater number of seat parameters to be changed.

Figure 13:
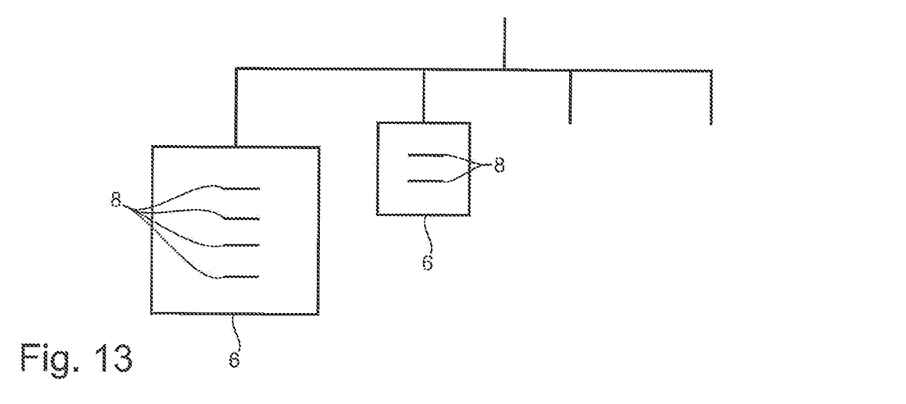
FIG. 13 shows a schematic functional overview of one operating level.

With the selection element (5), a certain operating level (6) is selected, which is a group of functions, for example, the adjustment of the seat parameters (3) for the entire seat (1) or for a specific component (12, 13, 14, 15) of the seat (1). A corresponding overview is shown in FIG. 13.

Alternatively, both an operating level (6) can be selected and a specific function (8) can be operated directly by means of the at least one selection element (5).

Figure 12:
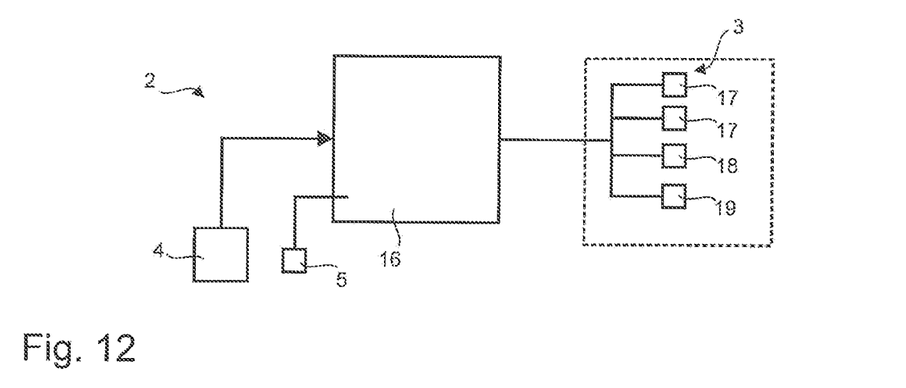
FIG. 12 shows a schematic functional overview of the operating device.

The operating device (6) comprises a control unit (16) which receives a control signal from the multifunction operating element (4). Furthermore, a corresponding selection signal or a control signal from the selection element (5) is received, as shown in FIG. 12. The control unit (16) then controls the corresponding devices to change the seat parameters (3) accordingly. Such devices are actuators (17), one or more spring and/or cushioning device(s) (18), or one or more seat comfort device(s) (19).

The at least one multifunction operating element (4) can be arranged on a lateral section (12a) of the seat cushion section (12). This can be seen in FIGS. 1, 4, 5 and 6, for example. Furthermore, the multifunction operating element can be arranged on a lateral section (15a) of the armrest (15). The respective lateral portion is located at the lateral boundary of the seat cushion section (12) or the armrest (15) in the width direction (Y1) of the seat (1).

The multifunction operating element (4) is designed in a tabular form.

Figure 5:
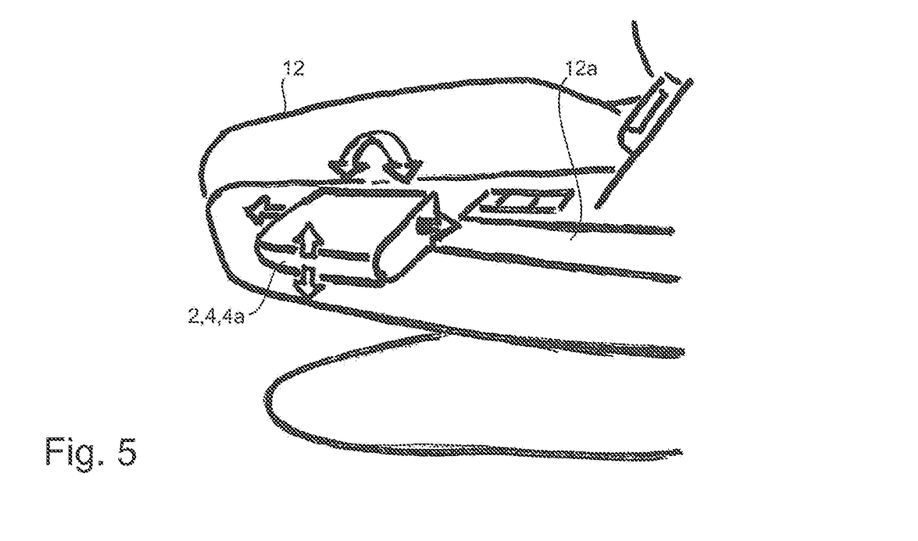
FIG. 5 shows a side view of a seat with an operating device according to a further embodiment.

While a seat (1) with only one multifunction operating element (4) is shown in FIG. 1, FIGS. 4 and 5 show an embodiment in which the seat has two multifunction operating elements (4). In this case, the first multifunction operating element (4a) is arranged on the seat cushion section (12) and the second multifunction operating element (4b) is arranged on the armrest (15). In the case of two existing multifunction operating elements (4, 4a, 4b), both multifunction operating elements (4, 4a, 4b) may have the same operating levels (6) with the associated functions (8) or different operating levels (6).

The respective multifunction operating element (4) can be moved in six switching directions (7, 7a-7f), wherein the multifunction operating element (4) has three axes of movement (X, Y, Z). This is shown in FIGS. 2a to 2d. Two opposite switching directions (7) are oriented along a movement axis (X, Y, Z) in each case.

Figure 2A:
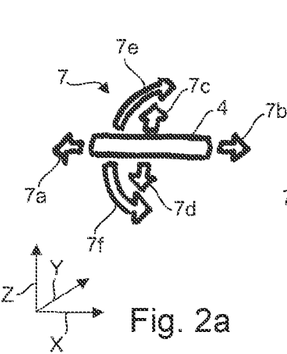
FIG. 2a shows a side view of the multifunction operating element.
Figure 2B:
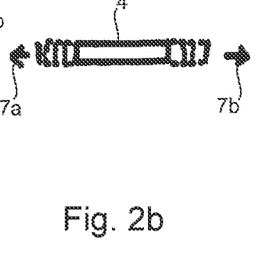
FIG. 2b shows another side view of the multifunction operating element.
Figure 2C:
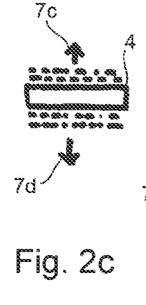
FIG. 2c shows another side view of the multifunction operating element.
Figure 2D:
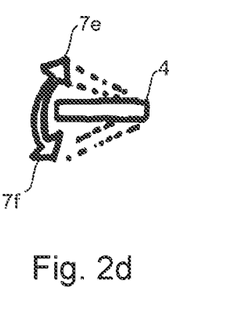
FIG. 2d shows another side view of the multifunction operating element.

FIG. 2b shows a first (7a) and a second switching direction (7b) of a translational movement of the multifunction operating element (4) along a first movement axis (X) in opposite directions. The multifunction operating element can thus be moved by pulling or pushing along the first (7a) or second switching direction (7b). The first movement axis (X) runs along the horizontal longitudinal direction (X1) of the seat (1).

The third (7c) and the fourth switching direction (7d) correspond to a translational movement of the multifunction operating element (4) along a second movement axis (Z) in respectively opposite directions.

Alternatively, the third (7c) and the fourth switching direction (7d) may correspond to a rotational movement of the multifunction operating element (4) about the first movement axis (X) in opposite directions. The second movement axis (Z) runs along the height direction (Z1) of the seat and is perpendicular to the first movement axis (X). Both a translational movement of the multifunction operating element (4) along the second movement axis (Z) and a rotational movement of the multifunction operating element about the first movement axis (X) means a movement of the multifunction operating element up or down for the person in the seat. The multifunction element (4) is connected to the seat cushion section (12, 12a) or the armrest (15, 15a) by means of a joint.

The fifth (7e) and sixth switching direction (7f) correspond to a rotational movement of the multifunction operating element (4) about the third axis of movement (Y) in opposite directions, respectively. The third movement axis (Y) runs along the width direction (Y1) of the seat (1) and is perpendicular to the first movement axis (X) and the second movement axis (Z).

Figure 3A:
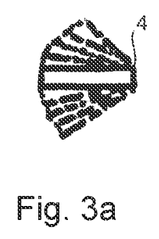
FIG. 3a shows a side view of the multifunction operating element according to further embodiments.
Figure 3B:
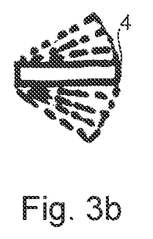
FIG. 3b shows another side view of the multifunction operating element according to further embodiments.
Figure 3C:
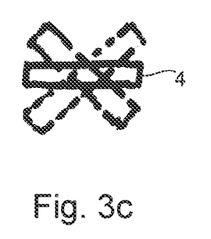
FIG. 3c shows another side view of the multifunction operating element according to further embodiments.

The pivot point can be arranged centrally, off-center of the multifunction operating element (4) as shown in FIG. 3c. According to the choice of the pivot point, a certain rotational movement of the multifunction operating element (4) results.

Alternatively, the pivot point could be located at a front end of the multifunction operating element (4), as shown in FIG. 3a. In FIG. 3b, an embodiment is shown in which the pivot point is arranged at the rear end of the multifunction control element (4).

Figure 8A:
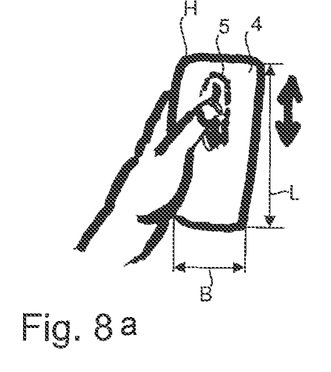
FIG. 8a shows a view of the multifunction operating element according to further embodiments.
Figure 8B:
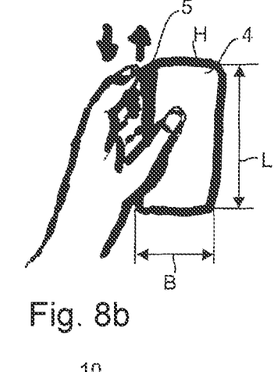
FIG. 8b shows another view of the multifunction operating element according to further embodiments.
Figure 8C:
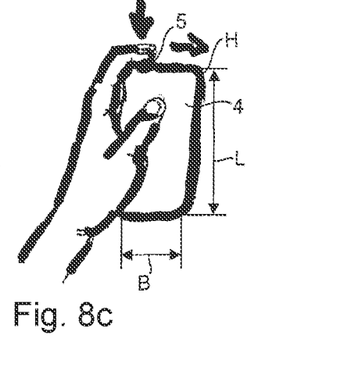
FIG. 8c shows another view of the multifunction operating element according to further embodiments.
Figure 9:
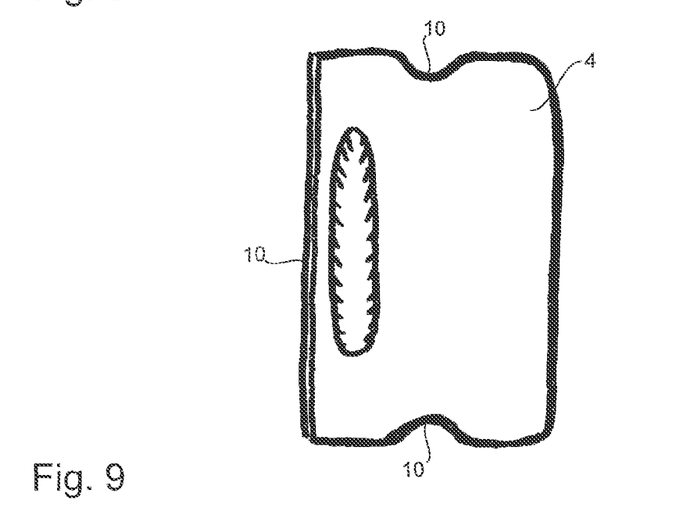
FIG. 9 shows a view of the multifunction operating element according to a further embodiment.
Figure 11:
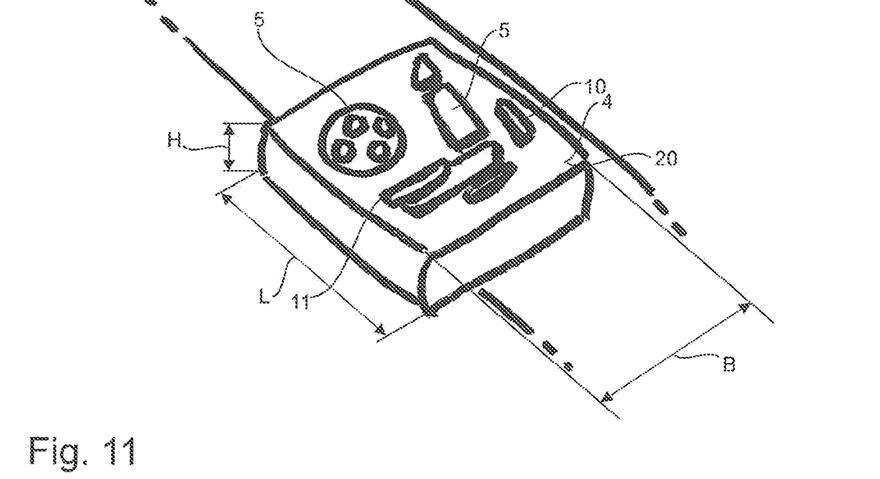
FIG. 11 shows a view of the multifunction operating element according to one further embodiment.

The selection element (5) is arranged on a surface of the tabular multifunction operating element (4). In FIG. 8, various possible surfaces are shown. In FIG. 8a, the selection element (5) is arranged on the surface which is bounded by the length (L) and the width (B) of the multifunction operating element (4). In FIG. 8b, the selection element (5) is arranged on the surface which is bounded by the height (H) and the length (L) of the multifunction operating element (4). In FIG. 8c, the selection element (5) is arranged on the surface which is bounded by the height (H) and the width (B) of the multifunction operating element (4). The selection element (5) may be a multi-stage switch or button. For example, a multi-stage slide switch is shown in FIGS. 8a to 8c. FIG. 11 shows a cross-shaped rocker switch. Furthermore, the multifunction operating element (4) can be equipped with haptic elements (9) and/or a grip layer (20).

Figure 10:
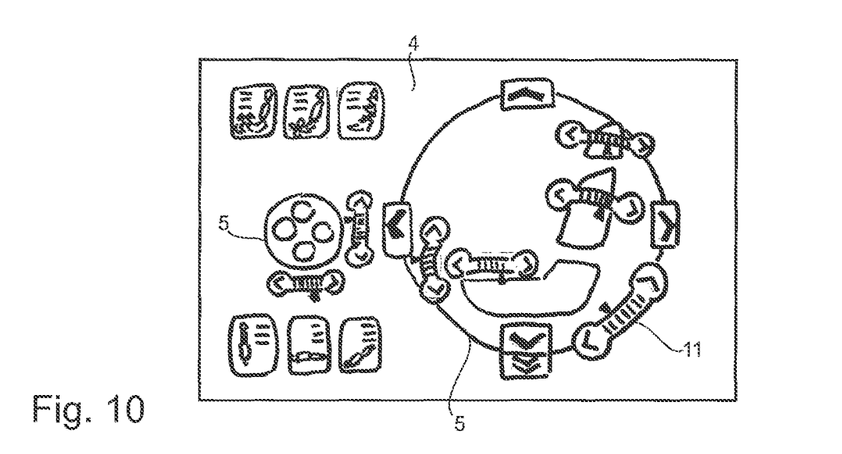
FIG. 10 shows a view of the multifunction operating element according to one further embodiment.

FIGS. 10 and 11 show an embodiment in which a display device (11) is arranged on the multifunction operating element (4). The selected operating levels and the selected functions can be displayed by means of such a display device.

Furthermore, the multifunction operating element (4) is provided with identification elements (10) by means of which the switching directions can be identified. Such identification elements (10) can be seen in FIG. 7 a/b, 8, 9.

Figure 7A:
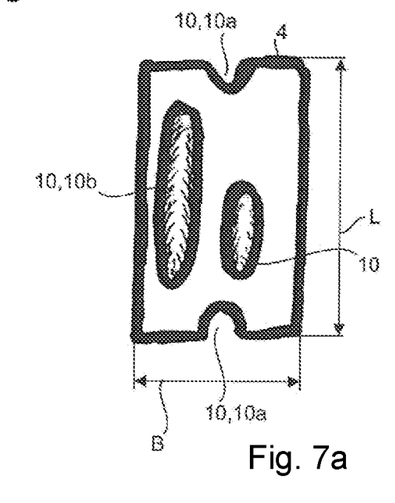
FIG. 7a shows a top view of the multifunction operating element according to further embodiments.
Figure 7B:
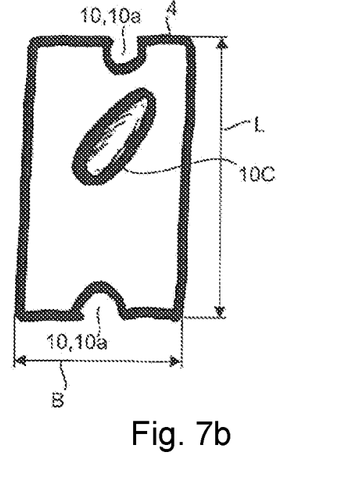
FIG. 7b shows another top view of the multifunction operating element according to further embodiments.

FIG. 7 shows identification elements in the form of recesses (10a) at the front and rear ends of the multifunction operating element (4), which can serve to identify the first and second switching directions (pull/push). Front and rear ends are understood to mean the surfaces bounded by the height (H) and width (B) of the multifunction operating element (4).

Furthermore, recesses (10b) may be provided on the top and bottom of the multifunction operating element, which can serve to identify the third and fourth switching directions (pull up/push down). The top and bottom are the opposing surfaces bounded by the length (L) and width (B) of the multifunction operating element (4).

In order to identify the fifth (7e) and the sixth switching direction (7f), a recess (10c) is shown in FIG. 7b with a shape corresponding to the finger position during the rotational movement in the fifth and the sixth switching direction.

The respective identification elements (10) can also be illuminated.

A specific switching direction (7) of a function (8) of a first operating level (6) may be associated with a change in a seat parameter (3) of a first element (1, 12, 13, 14, 15), which may be the entire seat (1) or one component (12, 13, 14, 15) with respect to a particular seating direction (X1, Y1, Z1). The same switching direction (7) of a function (8) of at least one further operating level (6) may be a change in a seat parameter (3) of a second element (1, 12, 13, 14, 15), which may be the entire seat (1) or one component (12, 13, 14, 15) with respect to a same seating direction (X1, Y1, Z1).

Furthermore, a movement of the multifunction operating element (4) in a switching direction (7) with respect to a movement axis (X, Y, Z) may produce a similar change in position and/or orientation of the entire seat (1) or at least one component (12, 13, 14, 15) with respect to a seat direction (X1, Y1, Z1) parallel to the axes of movement (X, Y, Z).

FIGS. 14 to 22 show corresponding functions with the associated switching directions according to one embodiment. Table 1 gives an overview of this.

Figure 14:
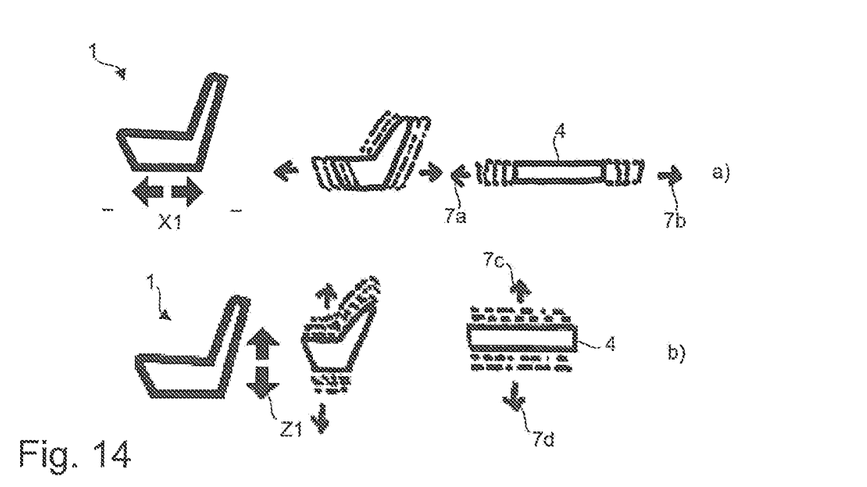
FIG. 14 shows a schematic illustration of a change to a seat parameter with the associated switching directions.

According to FIG. 14a, the first (7a) and second (7b) switching directions (push-pull, shift) of the seat longitudinal adjustment are in the operating level entire seat (1). When pushed, the entire seat (1) moves forward. When pulled, the entire seat (1) moves backwards.

According to FIG. 14b, the third (7c) and fourth (7d) switching directions (push grip down/up; push-pull) are assigned to the seat height adjustment in the operating level entire seat (1). When pushed up (pull), the entire seat (1) moves upwards. When pushed down (push), the entire seat (1) moves down.

Figure 15:
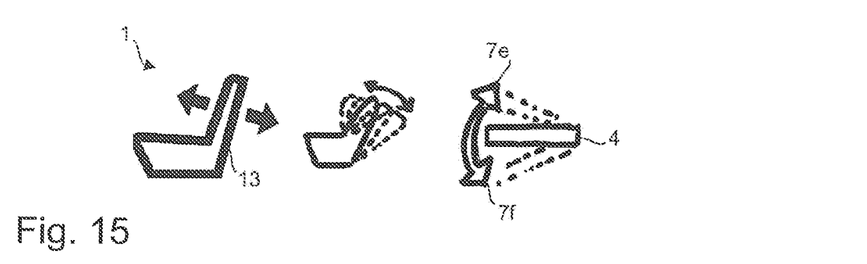
FIG. 15 shows a schematic illustration of another change to a seat parameter with the associated switching directions.

According to FIG. 15, the fifth (7e) and sixth (7f) switching directions (flip-over grip) are associated with the backrest inclination adjustment or the entire seat inclination adjustment in the operating level entire seat (1) or backrest (13). When tilted backwards, the backrest (13)/the entire seat (1) tilts backwards. When tilted forward, the backrest (13)/the entire seat (1) tilts forward.

Figure 16:
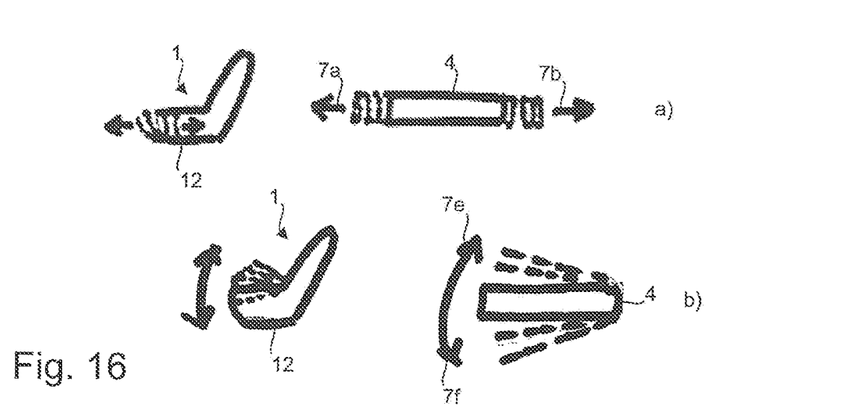
FIG. 16 shows a schematic illustration of another change to a seat parameter with the associated switching directions.

According to FIG. 16a, the first (7a) and second (7b) switching directions (push-pull, shift) are assigned to the seat cushion length adjustment in the operating level seat cushion section (12). When pushed, the seat cushion length becomes longer. When pulled, the seat cushion length becomes shorter.

According to FIG. 16b, the fifth (7e) and sixth (70 switching directions (flip-over grip) are assigned to the seat cushion inclination setting in the operating level seat cushion section (12). When tilted backwards, the seat cushion (12) tilts backwards. When tilted forward, the seat cushion (12) tilts forward.

Figure 17:
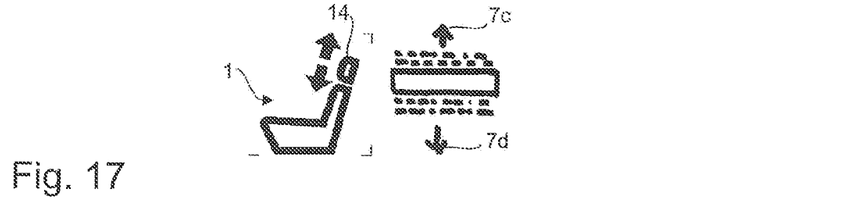
FIG. 17 shows a schematic illustration of another change to a seat parameter with the associated switching directions.

According to FIG. 17, the third (7c) and fourth (7d) switching directions (push grip down/up; push-pull) are assigned to the headrest height adjustment in the operating level headrest (14). When pushed up (pull), the headrest (14) moves upwards. When pushed down (push), the headrest (14) moves down.

Figure 18:
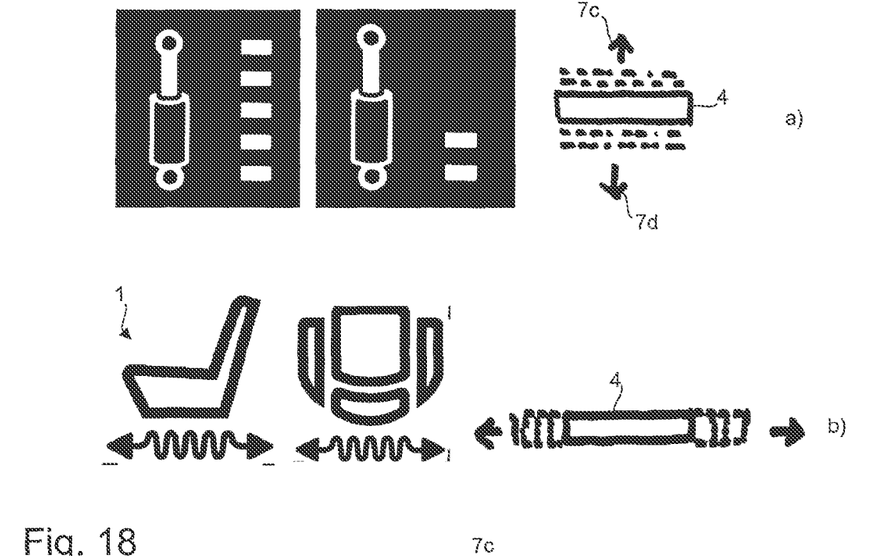
FIG. 18 shows a schematic illustration of another change to a seat parameter with the associated switching directions.

According to FIG. 18a, the third (7c) and fourth (7d) switching directions (push grip down/up; push-pull) are associated with the spring and/or cushioning characteristic in the operating level of the spring and/or cushioning device (18). When pushed up (pull), the spring and/or cushioning characteristic hardens. When pushed down (push), the spring and/or cushioning characteristic softens. Actuation in the third (7c) and fourth (7d) switching directions can take place in several stages, i.e. a further actuation in the same direction makes the spring and/or cushioning characteristic even harder or softer.

According to FIG. 18b, the first (7a) and second (7b) switching direction (push-pull, shift) are assigned in the X-direction in the operating level spring and/or cushioning device (18). When pushed, the spring and/or cushioning device (18) is turned on. When pulled, the spring and/or cushioning device (18) is turned off.

Figure 19:
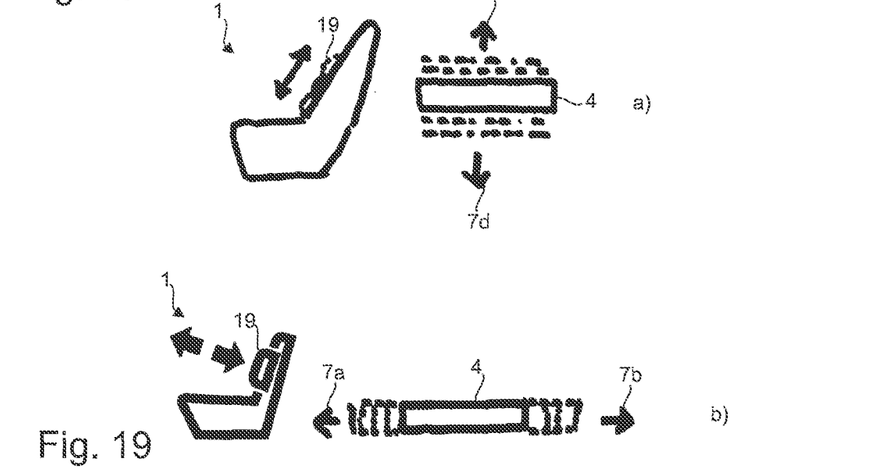
FIG. 19 shows a schematic illustration of another change to a seat parameter with the associated switching directions.

According to FIGS. 19a and 19b, the third (7c) and fourth (7d) switching directions (push grip down/up; push/pull) are assigned to the displacement of the lumbar support peak curvature in the operating level seat comfort device (19), lumbar support. When pushed up (pull), the lumbar support peak curvature is shifted upward. When pushed down (push), the lumbar support peak curvature is shifted down.

According to FIGS. 19a and 19b, the first (7a) and second (7b) switching directions (push-pull, shift) are assigned to the adjustment of the curvature of the lumbar support in the operating level seat comfort device (19), lumbar support. When pushed, the curvature of the lumbar support becomes stronger. When pulled, the curvature of the lumbar support becomes slighter.

Figure 20:
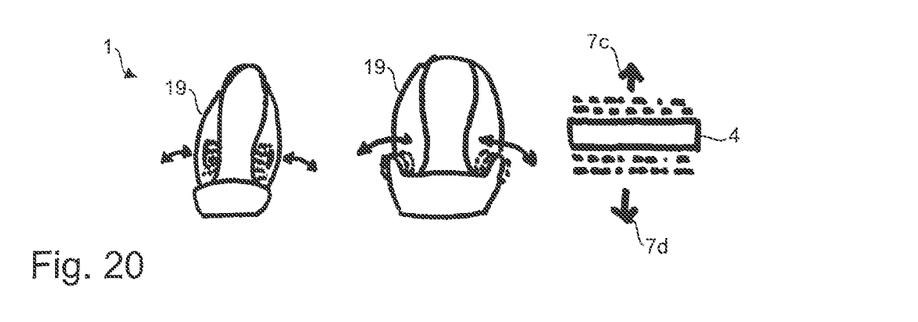
FIG. 20 shows a schematic illustration of another change to a seat parameter with the associated switching directions.

According to FIG. 20, the third (7c) and fourth (7d) switching directions (push grip down/up, push-pull) are assigned to the adjustment of the side bolsters of the backrest (13), or the side bolsters of the seat cushion section (12) in the operating level seat comfort device (19), side bolsters of the backrest, side bolsters of the seat cushion section (12). When pushed up (pull), the side bolsters in the backrest (13) or seat cushion section (12) become narrower. When pushed down, the side bolsters in backrest (13) or seat cushion section (12) become wider.

Figure 21:
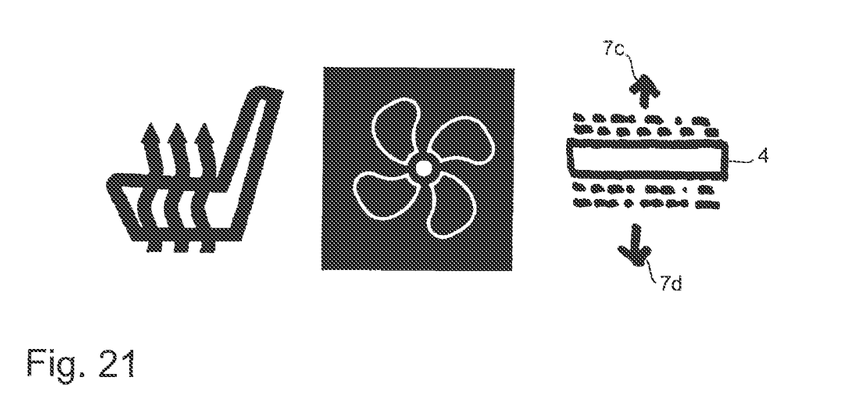
FIG. 21 shows a schematic illustration of another change to a seat parameter with the associated switching directions.

According to FIG. 21, the third (7c) and fourth (7d) switching directions (push grip down/up, push-pull) are assigned to the setting of the seat comfort device in the operating level seat comfort device (19), seat air conditioning (seat heating, seat ventilation). By pulling or pushing (push-pull), the seat heating, seat ventilation is switched on, gradually adjusted, and switched off. The following stages are provided: Pull—Heating (ventilation) on, Pull further—Heating level (ventilation level) higher, Press: Heating level (ventilation level) lower, Press further: Heating (ventilation) off.

Figure 22:
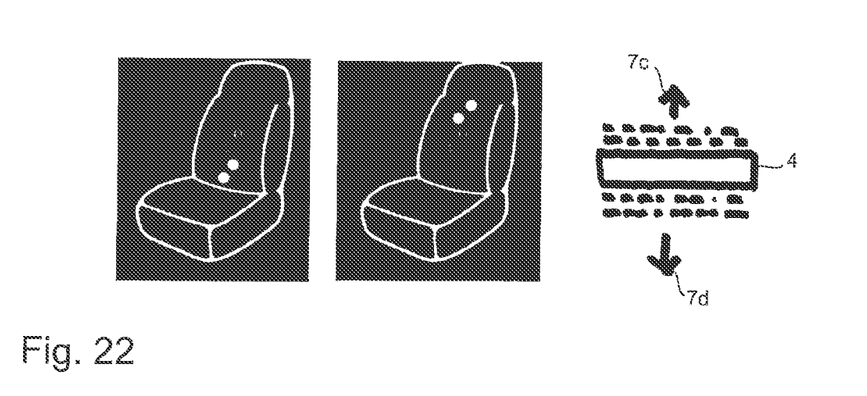
FIG. 22 shows a schematic illustration of another change to a seat parameter with the associated switching directions.

According to FIG. 22, the third (7c) and fourth (7d) switching directions (push grip down/up; push-pull) are assigned to the adjustment of the massage device in the operating level seat comfort device (19), massage device. By pulling or pushing (push-pull), the massage function is switched on, gradually adjusted, and switched off.

TABLE 1

| Operating level | Function | Switching direction | FIG. |
|---|---|---|---|
| Entire seat (1) | Seat forward/backward Longitudinal direction (X1) | first (7a)/second (7b) | 14a |
| Entire seat (1) | Seat up/down Height direction (Z1) | third (7c)/fourth (7d) | 14b |
| Entire seat (1) | Tilt seat With respect to axis along width direction (Y1) | fifth (7e)/sixth (7f) | — |
| Backrest (13) | Tilt backrest | fifth (7e)/sixth (7f) | 15 |
| Seat cushion section (12) | Seat cushion length | first (7a)/second (7b) | 16a |
| Seat cushion section (12) | Seat cushion tilt adjustment | fifth (7e)/sixth (7f) | 16b |
| Headrest (14) | Headrest forward/backward Longitudinal direction (X1) | first (7a)/second (7b) | 17 |
| Headrest (14) | Headrest up/down Height direction (Z1) | third (7c)/fourth (7d) | — |
| Headrest (14) | Tilt headrest With respect to axis along width direction (Y1) | fifth (7e)/sixth (7f) | — |
| Spring and/or cushioning device (18) in X1, Y1, Z1 direction | Spring and/or cushioning characteristics become softer or harder | third (7c)/fourth (7d) multi-stage | 18a |
| Spring and/or cushioning device (18) in X1, Y1, Z1 direction | Switch spring and/or cushioning device on or off | first (7a)/second (7b) | 18b |
| Seat comfort device (19) Lumbar support | Adjustment of the curvature of the lumbar support | first (7a)/second (7b) | 19b |
| Seat comfort device (19) Lumbar support | Lumbar support peak curvature up/down | third (7c)/fourth (7d) | 19a |
| Seat comfort device (19), side bolsters of the backrest (13), side bolsters of the seat cushion section (12) | Adjusting the side bolsters of the backrest (13), side bolsters of the seat cushion section (12) | third (7c)/fourth (7d) | 20 |
| Seat comfort device (19) Seat heating | Switch seat heating on or off or adjust it | third (7c)/fourth (7d) multi-stage | 21 |
| Seat comfort device (19), Seat ventilation | Switch seat ventilation on or off or adjust it | third (7c)/fourth (7d) multi-stage | 21 |

TABLE 1-continued

| Operating level | Function | Switching direction | FIG. |
|---|---|---|---|
| Seat comfort device (19), Massage device | Switch the massage device on or off or adjust it | third (7c)/fourth (7d) multi-stage | 22 |

All the features disclosed in the application documents are claimed as being essential to the invention provided that, individually or in combination, they are novel over the prior art.

LIST OF REFERENCE SIGNS

1 Seat
2 Operating device
3 Seat parameters
4 Multifunction operating element
4a First multifunction operating element
4b Second multifunction operating element
5 Selection element
6 Operating level
7 Switching direction
7a First switching direction
7b Second switching direction
7c Third switching direction
7d Fourth switching direction
7e Fifth switching direction
7f Sixth switching direction
8 Function
9 Haptic elements
10 Identification element
10a Recess
10b Recess
10c Recess
11 Display device
12 Seat cushion section
12a Lateral section of seat cushion section
13 Backrest
14 Headrest
15 Armrest
15a Side section of the armrest
16 Control unit
17 Actuator
18 Spring and/or cushioning device
19 Seat comfort device
X First movement axis
Y Third movement axis
Z Second movement axis
X1 Longitudinal direction
Y1 Width direction
Z1 Height direction
L Length of the multifunction operating element
B Width of the multifunction operating element
H Height of the multifunction operating element

What is claimed is:

1. An operating device for setting seat parameters of a vehicle seat, the operating device comprising:
   at least one multifunction operating element that is movable in at least five switching directions and is designed in a tabular form; and
   at least one selection element,
   wherein the at least one selection element enables a selection of at least two operating levels and is arranged on a surface of the at least one multifunction operating element,
   wherein each switching direction of the at least five switching directions can be assigned to a particular function that changes a seat parameter based on the selection of the at least two operating levels, and
   wherein, by the selection element, a first operating level of the at least two operating levels can be selected that includes a first group of functions that change a first set of seat parameters.

2. The operating device according to claim 1, wherein the operating device comprises two or more multifunction operating elements.

3. The operating device according to claim 1,
   wherein the at least one multifunction operating element is movable in six switching directions,
   wherein the at least one multifunction operating element has a first, a second, and a third axis of movement,
   wherein a first and a second switching direction correspond to a first translational movement of the at least one multifunction operating element along the first axis of movement in a first direction and a second direction, respectively,
   wherein a third and a fourth switching direction correspond to a second translational movement of the at least one multifunction operating element along the second axis of movement or a first rotational movement of the at least one multifunction operating element about the first axis of movement, and
   wherein a fifth and a sixth switching direction correspond to a second rotational movement of the at least one multifunction operating element about the third axis of movement.

4. The operating device according to claim 3, wherein the at least one multifunction operating element comprises a reset unit, so that the at least one multifunction operating element is displaceable into a starting position after a deflection along a specific switching direction after a predetermined time by the reset unit.

5. The operating device according to claim 4,
   wherein the at least one multifunction operating element is equipped with at least one of haptic elements or a grip layer, and
   wherein at least one of: the at least one multifunction operating element is provided with at least one identification element that enables identification of the at least five switching directions or an illumination is provided on the at least one multifunction operating element.

6. The operating device according to claim 1, wherein the at least one multifunction operating element comprises a reset unit, so that the at least one multifunction operating element is displaceable into a starting position after a deflection along a specific switching direction after a predetermined time by the reset unit.

7. The operating device according to claim 1,
   wherein the at least one multifunction operating element is equipped with at least one of haptic elements or a grip layer, and wherein at least one of: the at least one multifunction operating element is provided with at least one identification element that enables identification of the at least five switching directions or an illumination is provided on the at least one multifunction operating element.

8. The operating device according to claim 1, wherein a display device is arranged on the at least one multifunction operating element.

9. The vehicle seat with the operating device for setting the seat parameters according to claim 1.

10. The vehicle seat according to claim 9,
wherein the vehicle seat comprises a plurality of components, the plurality of components including a seat cushion section, a backrest, a headrest, and at least one armrest,
wherein the first operating level is assigned to at least one of an entire vehicle seat or at least one component of the plurality of components,
wherein a first seat parameter of the first set of seat parameters changed by a first function corresponds to a change in at least one of a position, an orientation, or a height of at least one of the entire vehicle seat or the at least one component of the plurality of components.

11. The vehicle seat according to claim 10,
wherein a first switching direction is assigned to the first function of the first operating level to change the first seat parameter of at least one of the entire vehicle seat or the at least one component of the plurality of components with respect to a first seat direction, and wherein the first switching direction of a second function is assigned to a second operating level to change a second seat parameter of at least one of the entire vehicle seat or at least one component of the plurality of components with respect to the first seat direction.

12. The vehicle seat according to claim 10,
wherein a movement of the at least one multifunction operating element in a first axis of movement direction causes at least one of a position or an orientation of at least one of the entire vehicle seat or the at least one component of the plurality of components to change with respect to a seating direction parallel to the first axis of movement direction.

13. The vehicle seat according to claim 9, wherein the operating device further comprises:
a control unit that receives a control signal from the at least one multifunction operating element and controls at least one actuator, wherein the at least one actuator alters the seat parameters relating to at least one of a position or an orientation of an entire vehicle seat or at least one component of a vehicle seat.

14. The vehicle seat according to claim 9,
wherein a second operating level is assigned to at least one of at least one spring or a cushioning device moveable in at least one of a vertical or a horizontal direction,
wherein associated functions of the second operating level correspond to parameter settings of at least one of the at least one spring or the cushioning device,
wherein the operating device comprises a control unit that receives a control signal from the at least one multifunction operating element and controls at least one of the at least one spring or the cushioning device,
wherein a third operating level is associated with at least one seat comfort device,
wherein one or more functions of the third operating level correspond to the parameter settings of the at least one seat comfort device,
wherein the at least one seat comfort device is at least one of a seat air conditioning device, a seat shape adjustment device, or a massage device, and
wherein the control unit receives a second control signal from the at least one multifunction operating element and controls the at least one seat comfort device.

15. The vehicle seat according to claim 9,
wherein the at least one multifunction operating element is arranged on at least one of a seat cushion section or on an armrest.

16. The vehicle seat according to claim 15,
wherein the at least one multifunction operating element is arranged on at least one of a lateral portion of the seat cushion section or a lateral portion of the armrest.

17. The vehicle seat according to claim 9, wherein both an operating level is selectable and a specific function is directly operable by at least one selection element.

18. The operating device according to claim 1,
wherein, by the at least one selection element, a second operating level of the at least two operating levels can be selected that includes a second group of functions that change a second set of vehicle parameters.

19. The operating device according to claim 1,
wherein the first operating level adjusts a seat heater, and
wherein, when the at least one multifunction operating element moves in a first switching direction of the at least five switching directions and the first operating level is selected, a seat heater is switched on.

20. The operating device according to claim 19,
wherein the at least two operating levels includes a second operating level,
wherein the second operating level adjusts a backrest of the vehicle seat, and
wherein, when the at least one multifunction operating element moves in the first switching direction and the second operating level is selected, the backrest tilts in a first direction.

* * * * *